United States Patent [19]

Hoekstra

[11] Patent Number: 5,473,606
[45] Date of Patent: Dec. 5, 1995

[54] COMMUNICATION BUS SYSTEM WITH MITIGATION OF SLAVE STATION LOCKING PROBLEM AND MASTER STATION FOR USE IN SUCH COMMUNICATION BUS SYSTEM

[75] Inventor: Jelle Hoekstra, Dorhing, England

[73] Assignee: D2B Systems Company Limited, Redhill, England

[21] Appl. No.: 274,945

[22] Filed: Jul. 14, 1994

[30] Foreign Application Priority Data

Jul. 16, 1993 [GB] United Kingdom .................. 9314860
Mar. 31, 1994 [GB] United Kingdom .................. 9406482

[51] Int. Cl.$^6$ ............................................... H04L 12/40
[52] U.S. Cl. ................. 370/85.2; 370/94.1; 340/825.07; 340/825.5
[58] Field of Search .................... 370/85.1, 85.2, 370/94.1, 85.9, 85.3, 85.6, 85.11, 85.15, 94.2; 340/825.06, 825.07, 825.5, 825.52, 825.51; 379/209

[56] References Cited

U.S. PATENT DOCUMENTS 4,937,816   6/1990   Van Steenbrugge et al. ......... 370/85.6
5,003,536   3/1991   Tanaka et al. .................... 340/825.5 X
5,031,175   7/1991   Tanaka et al. .................... 370/94.1
5,128,936   7/1992   Van Steenbrugge et al. ......... 370/85.6
5,249,182   9/1993   Van Steenbrugge et al. ......... 370/85.2
5,343,469   8/1994   Ohshima ......................... 370/85.1

Primary Examiner—Douglas W. Olms
Assistant Examiner—Russell W. Blum
Attorney, Agent, or Firm—David Schreiber

[57] ABSTRACT

A multistation communication bus system including a plurality of master stations and a slave station for transmitting information from the master stations and slave station using a frame based arbitration process. The master station which wins the arbitration transmits a framewise organized message including locking and unlocking signals for respectively, locking and unlocking an addressed slave station, thus blocking any other master station from accessing the slave station for a duration of multiple frames of the message.

Any other master station, upon detecting this blocking condition, executes a first sequence of retry undertakings at a combined time length that is substantially less than a standard maximum value of the duration. A second sequence of less frequent retry undertakings at a combined time length that is more than a standard maximum value of the duration may then be attempted.

6 Claims, 3 Drawing Sheets

COMMUNICATION BUS SYSTEM WITH MITIGATION OF SLAVE STATION LOCKING PROBLEM AND MASTER STATION FOR USE IN SUCH COMMUNICATION BUS SYSTEM

BACKGROUND OF THE INVENTION

The invention relates to a multistation communication bus system accommodating master stations and slave stations, any master station comprising frame based arbitration means, arbitration outcome detection means, and frame formatting means for upon winning said arbitration transmitting a framewise organised message including locking and unlocking signalizations for locking and unlocking respectively, an addressed slave station for a duration of multiple frames contained in said message, so that a different master station is blocked from at least in a particular manner accessing a locked slave station during said duration. Generally, such communication systems impose a maximum value on the allowable length of a frame, so that a particular master station cannot keep the whole system engaged for more than a reasonable interval of time. The consequence of this is that if a master station wants to send a long message to a particular slave station, this must be done in a sequence of frames that collectively constitute the message. In such case, the master station in question should be enabled to keep an addressed slave station free from addressing by other master stations between successive frames of this message. For this object the locking mechanism has been proposed, such as described, for example, in U.S. Pat. Nos. 4,937,816; 5,128,936; 5,249,182 (PHN 12.484) assigned to the assignee of the present application and herein incorporated by reference. In a particular embodiment, the maximum locking period may be 300 milliseconds. Now, if another master station tries to send a frame to the slave station in question, this will not be successful. The solution may be that the second master station repeats its undertaking at a later time. Nevertheless, the access should be as quickly as reasonably possible, in situations of either a locked or an unlocked slave station. In this respect it should be clear that even in an unlocked situation, the accessing by the further master station may be temporarily blocked, for example because the slave station has its receive buffer still filled with a previously received message. Other, less frequent causes for such blocking are electrical interference and temporary error.

SUMMARY OF THE INVENTION

Now, amongst other things, it is an object of the present invention to provide a communication bus system of the kind described, wherein a master station may access a slave station as quickly as possible, both when the slave station is temporarily locked to another master station and also in the case when the slave station is free from such locking. Thereto, according to one of its aspects, the invention is characterized in that said different master station has sequencing means for upon detecting said being blocked executing a first sequence of relatively frequent retry undertakings at a combined time length that is substantially less than a standard maximum value of said duration, and followed by a second sequence of relatively infrequent retry undertakings at a combined time length that is more than a standard maximum value of said duration. Through the first, relatively frequent undertakings, a brief error condition would only little delay the actual access to slave station, regardless of whether the latter is locked or unlocked. Through the second, relatively infrequent undertakings, the access becomes possible again after the locking has been terminated. Even if a temporary error condition occurred, the relatively long interval between successive elements of the second sequence would destroy the correlation with the same error on successive undertakings of the second sequence. In fact, there is a trade-off between more frequent undertakings that improve the performance, and less frequent undertakings that simplify the procedure and reduce the load on the communication bus and attached stations.

Advantageously, said different master station has second sequencing means for upon detecting non-acknowledge of a transmitted address intended for said slave station executing a third sequence of quasi-instantaneous undertakings for addressing said slave station, while only in case of detecting acknowledge of said address proceeding accessing said slave station. In certain situations, the slave will not acknowledge its address for some very short-lived reason. Another reason may be that the station is effectively absent. In both cases, the quasi-instantaneous retry on the level of the slave address will further speed up the overall operation, although the reasons for such speed-up are different. In the first case, the reason may quickly terminate, so that the access will become successful. In the second case, the undertaking master station may direct its facilities elsewhere.

The invention also relates to a master station for use in a communication system of the kind described.

Various advantageous aspects are recited in dependent Claims.

BRIEF DESCRIPTION OF THE DRAWINGS

These and other aspects and advantages of the invention will be described more in detail hereinafter, with reference to the preferred embodiments, and in particular with reference to the appended Figures, as follows:

FIG. 1 is a general representation of a single-channel communication bus system. Line 20 represents the channel, for example a twisted pair of conductors. There are provided three stations 22, 24, 26, each of which comprises a respective interface circuit 28, 30, 32. The stations may be of various complexities. Apparatus of this kind may be simple or complex, for example a television receiver, a washing machine, a microwave oven, a central timer, a sensor for ambient temperature/solar radiation, an illumination (sub-)system. Some apparatus will act as a master station viz à viz the bus, and other apparatus as a slave station. Some apparatus act as transmitters of data, and some apparatus as receives. The operations described below take place on the communication bus system and are executed by the interface circuits.

FIG. 2 shows the structure of a communication operation at the frame level. The Figure shows the time axis as a meandering line 40 along which the bit cells are assumed to be arranged in a contiguous manner. The reference numeral 42 indicates the start bit. The reference numeral 44 concerns the mode indication which indicates the bit rate at which subsequently data is to be transmitted; this concerns 3 bits at the most. A limited number of standardized transmission frequencies have been defined. The reference numeral 46 indicates the address of the relevant master station; this address contains 12 bits, followed by a parity bit P. An arbitration operation is performed on the mode indication, and on the master address. For the mode choice the lowest (= slowest mode prevails. For the addresses the station having the highest priority prevails. Mode indication and master address together constitute a priority signal. After the transmission of the master address, only one master station remains. This station subsequently transmits the slave address 48. This address contains 12 address bits, one parity bit P and space for an address acknowledge bit A. When a slave station recognizes its own address, it transmits an address acknowledge bit in the block A. When the latter bit is not received, the intended slave station is either absent or does not operate, or the address has an incorrect parity. In that case the frame shown in FIG. 2 is immediately terminated. When the acknowledgement by the slave station is correct, the master station transmits a control signal 50. This signal contains four control bits, one parity bit P and space for a control acknowledge bit A. The treatment of the P and A bits is identical to that in the case of the slave address. If the control acknowledge bit does not appear, the frame is directly terminated. When the acknowledgement by the slave station is correct, a data byte is transmitted (52). The description will be based on a master transmitter station. The data byte contains 8 bits, a signalling "last" data byte (EOD), one parity bit P and space for a data acknowledge bit A. The EOD signalling indicates whether the transmitter station considers the byte concerned as the last byte or as a non-last byte of the message. The frame length amounts to at the most 2 bytes in mode 0; in mode 1 it amounts to 32 bytes from (master station) or 16 bytes from (slave station); in the mode 2 it amounts to 128 bytes from (master station) or 64 bytes from (slave station), but shorter messages are also permissible. The parity bit P is determined also on the basis of the EOD bit. If the data acknowledge bit is not received, there may be a variety of reasons: a parity error, slave station deactivated since the reception of the control signal 50, or slave station incapable of receiving and buffering the data byte, for example because the processing of the data had taken too much time. In all these cases the master station is set to the repeat state. In this state the relevant data byte, including the facilities for EOD, P, A, is repeated until ultimately the data acknowledge bit is received. Then, if the relevant data byte was not the last byte, the repeat state is left and the next data byte is transmitted (for example 54). If, however, it was the last data byte, the frame and the message are terminated. Subsequently a new message/frame may commence. Upon transmission of a data byte, each time a counter position is incremented. When the counter reaches the maximum frame length, or when the message is completed, the "last" data byte is indicated (the first one of the two limits occurring is decisive). The frame is terminated after the "last" byte. If the data acknowledge bit is not correctly received after the "last" byte, the "last" byte is repeated, for as long as it fits within the defined frame length. When the message has not yet been completed when the maximum frame length is reached, a new frame is started. The first data byte thereof is taken as the first not yet transmitted data byte of the message, or as the data byte for which no correct data acknowledge bit had yet been received. Consequently, this implies no double transmission of a data byte already transmitted successfully. Normally, the "lock" mechanism is used in this respect, so that the relevant slave remains reserved for the actual transmission. This will be described in detail hereinafter. According to this lock mechanism, another master station having a higher priority can meanwhile obtain the monopoly over the bus, but cannot gain access to the slave station that had been locked. This organization simplifies the procedure in the slave station.

Figure 1:
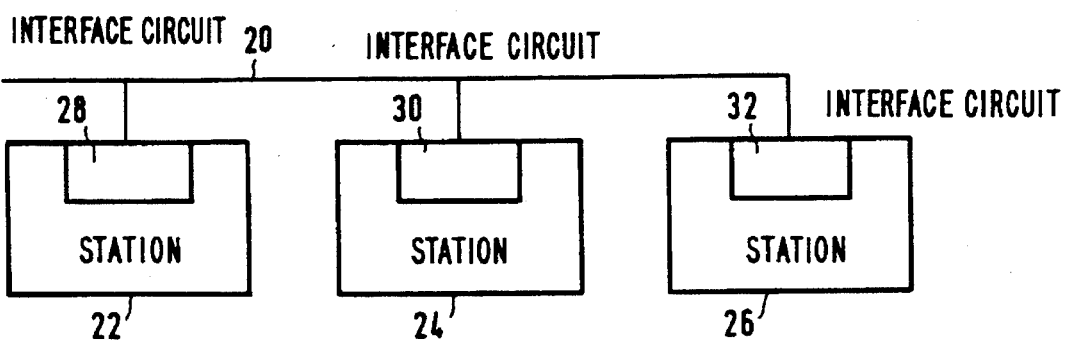
FIG. 1 is a general representation of a single-channel communication bus system.
Figure 2:
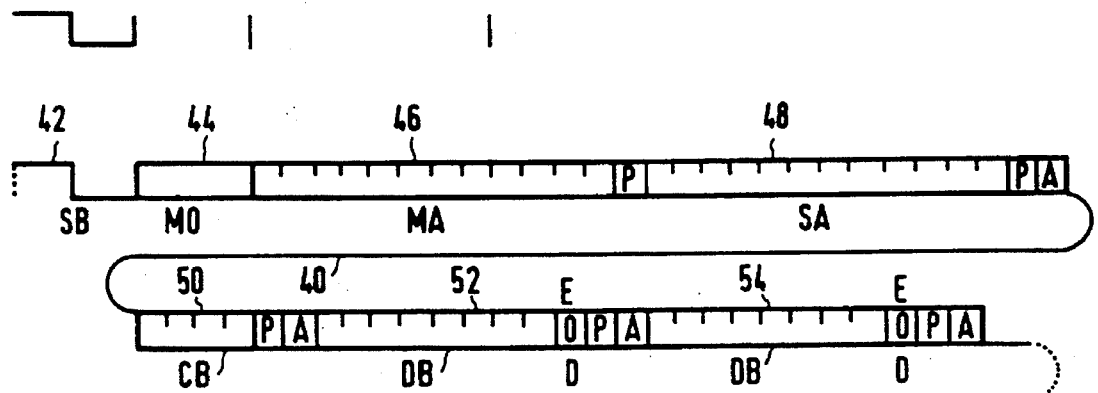
FIG. 2 shows the structure of a communication operation.

The master station can set/reset the lock flag at the slave by means of a given control signal, thus instructing the slave to listen only to the master station concerned. The slave station is unlocked by the master station in that the latter transmits a 1-byte-data frame, containing the release or unlock command. The lock flag should be set/reset by the slave after at least 1 byte of the associated frame has been correctly transmitted/communicated.

A slave address acknowledge bit is not given if:

the slave is absent the slave cannot handle the mode (speed) of the frame a parity error occurs in the master address and/or slave address timing is incorrect, causing bus errors, so that synchronization or parity errors occur.

The master responds to a negative address acknowledge bit by either repeating the frame, possibly in a lower mode requesting the status for the relevant slave in the mode 0 (possibly repeatedly). The highest mode in which the slave can operate is derived from the status. Subsequently the message is repeated in the highest feasible mode.

When the transmission repeatedly stops at the negative slave address acknowledge bit, it must be concluded that the slave is absent. In that case further repetition does not make sense.

A control acknowledge bit is not given in the case of:

parity error timing error inability of the slave to execute the requested function.

The master may respond by repeating the message in first instance. If again no control acknowledge bit is received, it requests the master station at the slave in order to determine why it did not receive this acknowledge bit.

A negative data acknowledge bit is caused by:

parity error timing error full receiver buffer.

In the case of a parity error or in the case of a full receiver buffer, this byte will be repeated, as far as possible, until either the byte has been acknowledged or the frame length has been used up. If the byte has not been transmitted within the frame, a new frame will be initiated for this byte.

The following control signals are defined:

HEX 0(0000): read the status of the interface circuit of the slave station. If this operation is not followed by an acknowledge signal, the conclusion is that the interface circuit of the slave station is defective. However, a repeat operation may be undertaken. If correct acknowledgement is received, the slave station subsequently outputs a data byte in which its status is shown.

HEX 2(0010): read the status and apply the lock signal to the slave station. When the slave station is locked by another master station, this circumstance is signalled in the data byte; the requesting master must attempt again.

HEX 3(0011): read data and apply the lock signal to the slave station. If no answer is received, the status is interrogated, which is specified as follows:
bit 0=0: the transmitter buffer of the slave station is empty; this is signalled to the control system
bit 2=1: the slave station is locked by another station; the control system receives the instruction to attempt again
bit 4=0: the slave station cannot transmit data; this is signalled to the control system.
In all other cases for the bits 0, 2, 4 a new frame is initiated with the same control code.
HEX 4(0100): read the two least-significant tetrades of the address whereto the slave station is locked. If the slave station is not locked, this fact is signalled to the control system of the master, by means of a negative acknowledge bit.
HEX 5(0101): ditto for the most-significant tetrade.
HEX 6(0110): read the status of the slave and unlock. If the slave station is locked by another master station, this is signalled by a negative acknowledge bit, and the master stops its attempts.
HEX 7(0111): read the data and unlock. Except for the unlock, this corresponds to the code 0011.
HEX 8(1000): write possession request; if a negative acknowledge bit ensues, a query for the properties/status of the slave station is made. The latter are interpreted as follows:
bit 1=1: the receiver buffer of the slave is not empty; signal to the control system of the master station.
bit 2=1: as above.
bit 3=0: slave does not have a memory which means that the slave is not able to answer requests for property/status.
If none of the three bits has a result, a new attempt is made.
HEX A(1010): write command and lock. Subsequently the status is read, in case of a negative acknowledge bit, interpreted as follows:
bits 1, 2 as above; if none of these bits has a result, a new attempt is made.
HEX B(1011): write data and lock. Subsequently the status is read, in case of a negative acknowledge bit; interpretation is the same as with HEX A.
HEX E(1110): write command and unlock; remainder is identical to A.
HEX F(1111): write data and unlock; remainder is identical to A.

At the end of each frame the transmitting station (slave station or master station) checks whether all necessary bytes have been transmitted. If this is not the case, the master station starts a new frame and the transmitting station loads the remaining bytes into the local transmitter buffer.

DESCRIPTION OF AN INTERFACE CIRCUIT

Figure 3:
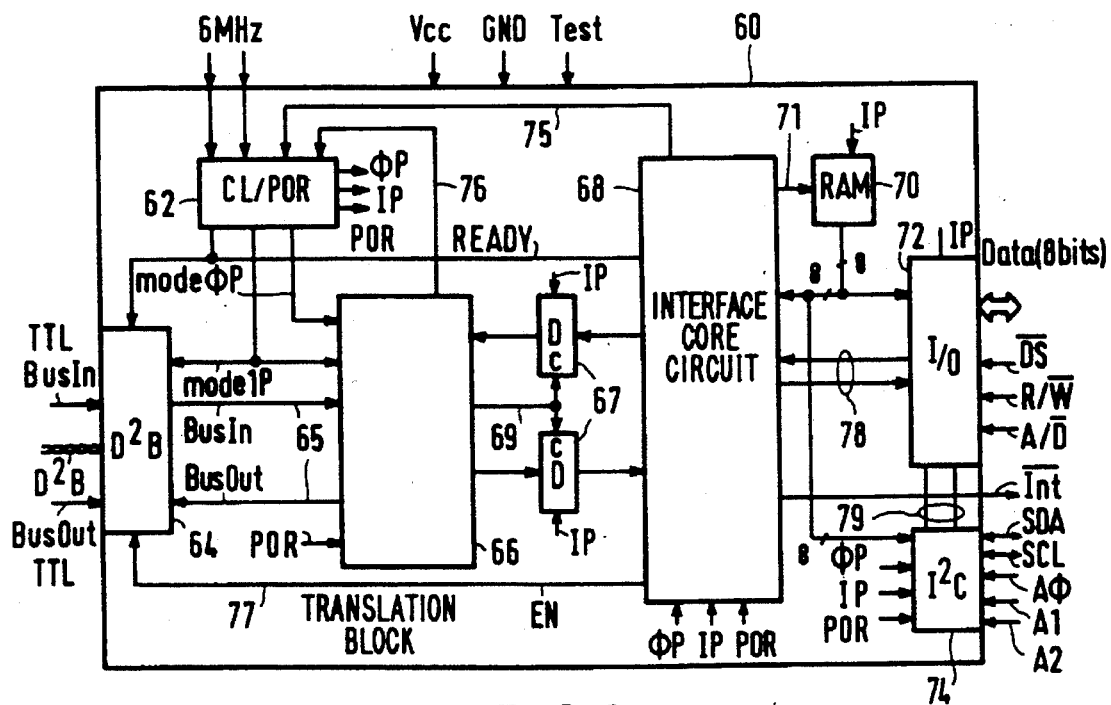
FIG. 3 shows an embodiment of an interface circuit.

FIG. 3 shows an embodiment of an interface circuit. The circuit (60) comprises the following connections, viewed clock-wise from the oscillator (6 MHz): —power supply VCC, ground GND, test control test, 8 bits data for the local control system, with a synchronization (strobe) pin $\overline{DS}$, read/write control R/$\overline{W}$, selection between address and data (A/$\overline{D}$), an interrupt signal Int, three preset address bits therefor (A0, A1, A2), two lines for data at the TTL level, and a twisted wire pair for the single-channel communication ($D^2B$) as described above. Element 62 comprises the clock and the control components for the resetting of the circuit when the supply voltage appears (POR=Power-On Reset). A "chip-ready" signal, the POR signal and the clock signals 0P, 1P originate herefrom. The "chip-ready" signal indicates that the circuit is operational again after power on and reset.

Block 64 is a circuit for the filtering, detection and controlling of signals on the $D^2B$ and TTL lines. The data contents of the signals on $D^2B$ and TTL are identical, except for the following electrical differences: TTL is unidirectional versus $D^2B$ which is bidirectional, and the voltage levels differ. On lines 65 the line bits are transported at the TTL level. In block 66 a translation takes place between the line bits and the logic bits. The blocks 67 constitute two unidirectional latch circuits between the blocks 66 and 68. Line 69 carries a signal for activating the next bit. Block 68 constitutes the core of the interface circuit. Therein the parity bits are formed, the acknowledge bits are detected and the various control bits and status bits are analyzed or stored for interrogation, if any. Furthermore, the information is exchanged with the control system and the interaction with RAM buffer 70 is organized. Buffer 70 has a data with of 8 bits; the number of bytes is determined by the application. The addresses appear on line 71; block 72 is a data gate having a width of 8 bits for connection to the local control system (not shown). The signals mode 0P, 1P, are secondary clock signals having the same frequency as 0P, 1P, or a frequency which is a factor 4 lower, depending on the operation mode on the external bus $D^2B$. Line 76 controls the switching over of the clock to the bit level for the various bit lengths, which need not be the same for the start bit, mode/address/control bits and data bits. Line 75 has the same function at the frame level. Line 77 is an enable line (EN); lines 78 and 79 provide synchronization handshake.

In a simple embodiment the circuit is suitable for use in the mode 0 and 1; moreover, it is suitable for master operation as well as slave operation. After a reset signal (power-on-reset, POR), the circuit is initialized. The microprocessor can make the address of the circuit available to the interface circuit by loading of some free-accessible registers. Moreover, some flag bits which indicate the capacities of the application are set (when a local memory is present and the slave station can also act as a transmitter). The signal POR also causes an interrupt signal for the local control system. The bus status of the slave part of the circuit is stored in the slave status register. When the circuit is locked by another station, the address of the latter station is stored in the lock address register. In order to activate a circuit as a master station, the control circuit of the application should provide the following information:

the slave station address, the control code and, in the case of a write operation, the data bytes to be transmitted in order to be loaded into the master station buffer, the mode signal, indicating the line mode to be used, and the master station request signal are loaded into the master station command register.

The station subsequently initiates a message and participates, if necessary, in the relevant arbitration procedure. When the frame is terminated after a positive arbitration result, an interrupt signal for the local control system (INT) is given. The local control system can subsequently read the reason of the interrupt signal in the interrupt register (master interrupt, slave transmitter interrupt or slave receiver interrupt). The master status register contains the number of positive acknowledge bits and indicates whether the message was successful. The latter register thus acts as a counter. Moreover, after an interrupt signal in the case of a read operation, the master buffer contains the data received. The interrupt register is reset after having been read: this is effected by an explicit write operation in the register question.

Virtually the same operations are performed for a slave receiver function. The number of positive acknowledge bits is then stored in the slave receiver register. When the slave receiver buffer has been read, the slave receiver command register is filled with the information 00(HEX).

Figure 4:
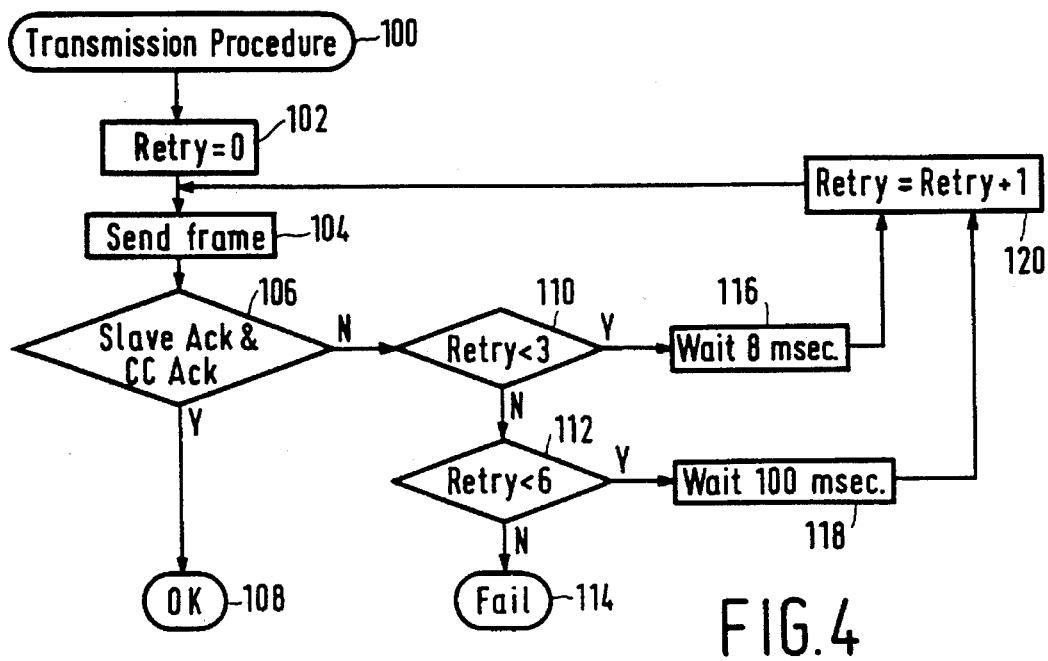
FIG. 4 is a flow chart of a retry procedure.

FIG. 4 is a flow chart of a retry procedure by a master station. In this embodiment, the maximum length of a locking period is 300 milliseconds. Block 100 represents the start of the transmission procedure, which means that the station in question would know what data to transfer and with respect to what slave station. The procedure may relate to a wholly or partly slave-transmitter situation. In block 102 a retry parameter is reset to zero. In block 104 the master undertakes the sending of a frame, which may include an arbitrage procedure. For the entering of block 106, it is supposed that both the initiating and the arbitrating for the frame in question have been successful for the master station. In block 106 it is tested whether the slave station sends positive acknowledgements on its own address and on the control code CC, the latter indicating that the master station wants a particular activity from the slave. Various possibilities exist. For one, the control code may just require that the slave station reports its activity state, which would not interfere with the activities that represent the locked state itself. Another control code would require an extensive data exchange that would not be allowed with a locked slave. Generally, if the acknowledge is positive, the system goes to block 108, wherein the operations take place, and which are eventually completed. If block 106 gives a negative acknowledge, in block 110 the retry parameter is tested. If the value is below 3, block 116 implements a brief waiting time, and in block 120 the parameter is incremented. The loop 104, 106, 110, 116, 120 is circled at most three times. If the parameter value attains 3, the system goes to blocks 112, 118, that implement a longer waiting time. Also this latter loop is circled at most three times. Finally, if the parameter value attains 6, the system admits failure and goes to exit block 114. The total time for executing the procedure is about 324 milliseconds.

Recapitulating, there are three relevant categories of errors:

Cause: temporary transmission error, e.g. electrical interference. Timing rule: none, because this error should last very short.

Cause: slave receiver buffer is full. Timing rule: slave must service its receive buffer chip within 25 milliseconds. Master procedure: retransmit 3 times, with at least 8 milliseconds in between, because 3*8 milliseconds plus transmission times of the associated frames is more than 25 milliseconds.

Cause: slave is locked to another master. Timing rule: no master may keep a slave station locked longer than 300 milliseconds; in case of error slave should unlock itself after 300 milliseconds.

Figure 5:
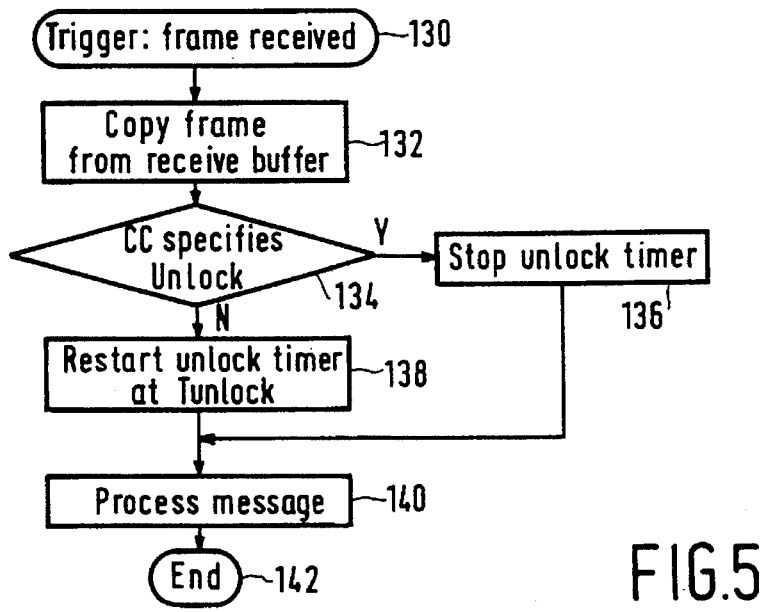
FIG. 5 is a flow chart of an unlocking procedure.
Figure 6:
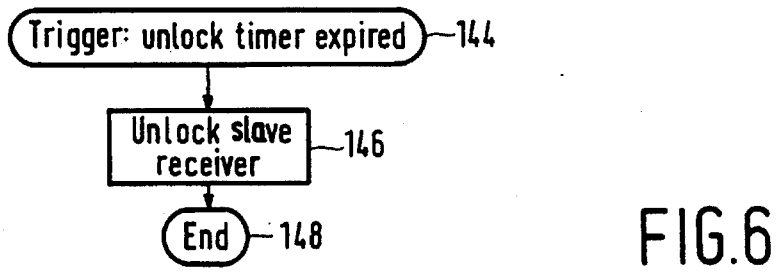
FIG. 6 is a flow chart of a second unlocking procedure.

Additionally, there is a procedure for the slave to unlock itself in the situation that the master due to an internal error did not unlock the slave, which is shown in FIGS. 5 and 6. The flow chart from FIG. 5 starts in block 130 when a frame is received. Subsequently, in block 132, the frame present in the receive buffer is copied to the local processing arrangement of the station. In block 134 it is detected whether the frame so acquired contains an unlock code. If this frame contains an unlock signalization (Y), in block 136 the unlock timer is stopped. If the unlock signalization is not found (N), in block 138 the unlock timer is restarted. In this particular organization, each frame comprises either an unlock (=last frame), or a lock (=non-last frame). In either case, in block 140 the frame or message is processed. In block 142, the procedure ends. In FIG. 6, the self-unlock procedure by a locked station is shown. In block 144 the expiration of the unlock timer after 300 milliseconds is detected. In block 146 the slave is effectively unlocked. In block 148 the procedure ends. Of course, the master station, not knowing this, may at the next frame of the yet unterminated message get the slave station in question locked again.

Figure 7:
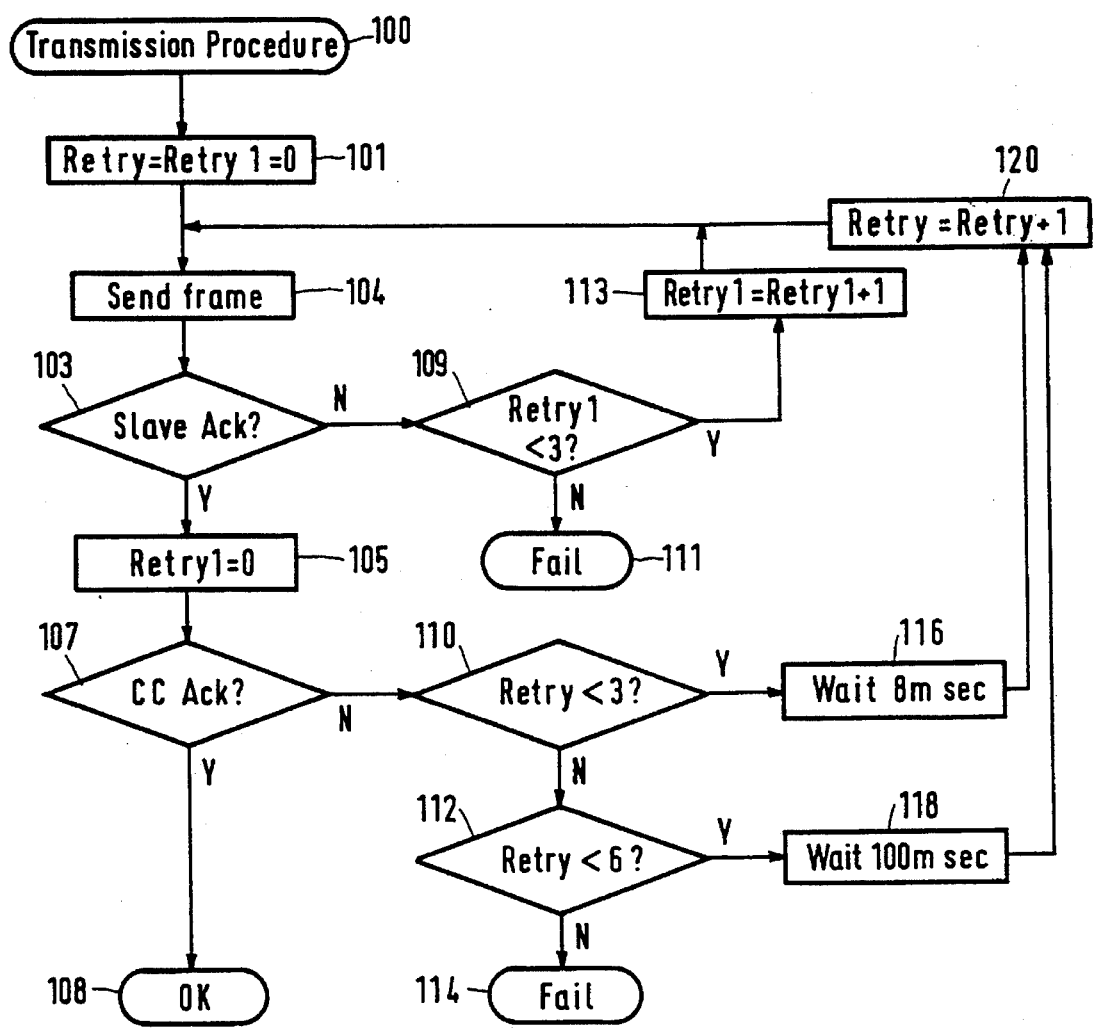
FIG. 7 is a flow chart of a refined retry procedure.

FIG. 7 is a flow chart of a retry procedure that is refined with respect to FIG. 4. Generally, corresponding blocks have been shown with identical labels. The differences are as follows. In block 101 two retry parameters, Retry and Retry1 are both reset to zero, of which the first one has been discussed with respect to FIG. 4 already. In block 103 it is tested whether the slave station sends a positive acknowledge with respect to its own address. If this acknowledge is not received, the master station in block 109 executes a test on the value of parameter Retry 1. If the transmission has been executed less than three times, in block 113 the value of parameter Retry1 is incremented by 1, whereupon the system reverts to block 104. If the parameter Retry1 reaches the value 3, the system exits to block 111 and the master station must direct itself to other operations. The loop so described is executed quasi-instantaneously. This means anyway that its cycle time is appreciably less than that of the next slower loop, that has its cycle time substantially determined in block 116. The delay may be in the microsecond range, but a value of a few milliseconds could be appropriate.

If in block 103 the test is positive, in block 105 the parameter Retry1 is reset to zero again. This measure avoids the rash termination of the attempt if after three passages through block 113 and a subsequent success in block 103, by accident the slave address acknowledge fails once more. However, in certain realizations, block 105 may be omitted. In block 107, the test on the control code CC is executed. In both possible outcomes, the system proceeds as in FIG. 4.

What is claimed is:

1. A multistation communication bus system including a plurality of master stations for addressing a slave station by winning an arbitration, one of said master stations comprising:

a first master station including:

frame-based arbitration means for attempting to address said slave station;

arbitration outcome detection means for detecting whether said slave station is addressed;

frame formatting means for, upon winning said arbitration, transmitting a frame-wise organized message including locking and unlocking signals for locking and unlocking, respectively, said addressed slave station for a duration of multiple frames contained in said message so that another of said master stations is blocked from, at least in a predetermined manner, accessing a locked station during said duration; and a second master station including:

sequencing means, for upon detecting being blocked, executing a first sequence of retry undertakings at a combined time length that is substantially less than a standard maximum value of said duration followed by a second sequence of retry undertakings, said undertakings in said second sequence having a lower frequency than said undertakings in said first sequence, at a combined time length more than a standard maximum value of said duration.

2. The system as claimed in claim 1, wherein said second master station further includes further sequencing means for, upon detecting a non-acknowledge status of a transmitted address intended for said slave station, executing a third sequence of substantially instantaneously retry undertakings for addressing said slave station and for, upon detecting an acknowledge status of said address, accessing said slave station.

3. The system as claimed in claim 1, wherein at least one of said first sequence and said second sequence has at least three successive retry undertakings.

4. The system as claimed in claim 1, wherein said bus system is a $D^2B$ bus.

5. A master station for use in a communication bus system having a plurality of masters stations for accessing a slave station, comprising:

frame-based arbitration means for attempting to address said slave station;

arbitration outcome detection means for detecting whether said slave station is addressed;

frame formatting means for, upon winning said arbitration, transmitting a frame-wise organized message including locking and unlocking signals for locking and unlocking, respectively, said addressed slave station for a duration of multiple frames contained in said message so that another of said master stations is blocked from, at least in a predetermined manner, accessing a locked station during said duration; and sequencing means, for upon detecting being blocked, executing a first sequence of retry undertakings at a combined time length that is substantially less than a standard maximum value of said duration followed by a second sequence of retry undertakings, said undertakings in said second sequence having a lower frequency than said undertakings in said first sequence, at a combined time length more than a standard maximum value of said duration.

6. The master station as claimed in claim 5, further including sequencing means for, upon detecting a non-acknowledge status of a transmitted address intended for said slave station, executing a third sequence of substantially instantaneously retry undertakings for addressing said slave station and for, upon detecting an acknowledge status of said address, accessing said slave station.

\* \* \* \* \*